(12) United States Patent
Edwards (10) Patent No.: US 7,337,837 B2
(45) Date of Patent: *Mar. 4, 2008

(54) AIR CONDITIONING SYSTEM

(75) Inventor: Roger Gene Edwards, Sunbury, OH (US)

(73) Assignee: Columbus Heating & Ventilating Company, Columbus, OH (US)

( * ) Notice: Subject to any disclaimer, the term of this patent is extended or adjusted under 35 U.S.C. 154(b) by 210 days.

This patent is subject to a terminal disclaimer.

(21) Appl. No.: 11/200,255

(22) Filed: Aug. 9, 2005

(65) Prior Publication Data

US 2006/0032624 A1 Feb. 16, 2006

Related U.S. Application Data

(63) Continuation of application No. 10/281,641, filed on Oct. 28, 2002, now Pat. No. 7,114,553.

(60) Provisional application No. 60/340,621, filed on Dec. 13, 2001.

(51) Int. Cl.
*F25B 29/00* (2006.01)

(52) U.S. Cl. .................. 165/201; 165/48.1; 165/59; 165/62; 126/110 R; 236/49.3

(58) Field of Classification Search ............... 165/201, 165/240, 205, 207, 48.1, 58, 59, 61, 62, 63, 165/64, 120, 121, 122; 126/110 A, 110 R; 236/49.3; 122/149; 421/263
See application file for complete search history.

(56) References Cited

U.S. PATENT DOCUMENTS

| 1,734,310 | A | | 11/1929 | Taylor |
| 2,751,900 | A | * | 6/1956 | Modine .................. 126/110 B |
| 3,465,816 | A | | 9/1969 | Fichtner |
| 3,743,010 | A | | 7/1973 | Farney et al. |
| 3,926,173 | A | * | 12/1975 | Jury ........................ 126/110 R |
| 4,127,100 | A | * | 11/1978 | Baker ..................... 126/110 B |
| 4,135,487 | A | | 1/1979 | Hays |
| 4,160,440 | A | * | 7/1979 | Barnickle ............... 126/110 R |
| 4,261,326 | A | * | 4/1981 | Ihlenfield .................... 165/122 |
| 4,318,392 | A | | 3/1982 | Schreiber et al. |
| 4,372,286 | A | * | 2/1983 | Baker .......................... 126/77 |
| 4,549,601 | A | | 10/1985 | Wellman et al. |
| 4,619,242 | A | * | 10/1986 | Smith ..................... 126/110 R |
| 5,368,474 | A | | 11/1994 | Welden |
| 6,250,560 | B1 | | 6/2001 | Kline et al. |
| 7,096,933 | B1 | * | 8/2006 | Zia et al. .................... 165/170 |

* cited by examiner

*Primary Examiner*—Ljiljana Ciric
(74) *Attorney, Agent, or Firm*—McNees Wallace & Nurick LLC (57) ABSTRACT

A self-contained, fully-integrated, energy efficient heating and cooling system or apparatus for conditioning the air on the interior of a building which includes a means for creating airflow through the apparatus, a section for cooling the airflow, a section for heating the airflow, a means for directing the airflow into the cooling section or into the heating section, a reheat device for tempering (i.e., reheating) the airflow exiting the cooling section, a return air section for receiving air returned to the apparatus from the building interior, and a means for pulling the returned air out of the return air section and venting the returned air to the environment outside of the building. The heating section of the present invention also provides a "four-pass" heat exchanger which may be assembled from sections of cast iron or other suitable materials, and a high efficiency combustion burner which may be integrated into the four-pass heat exchanger.

15 Claims, 5 Drawing Sheets

AIR CONDITIONING SYSTEM

CROSS-REFERENCE TO RELATED APPLICATION

This application is a continuation of U.S. Utility Application No. 10/281,641 filed on Oct. 28, 2002 now U.S. Pat. No. 7,114,553 entitled "Air Conditioning System". This application also claims the benefit of U.S. Provisional Application No. 60/340,621 filed on Dec. 13, 2001 entitled "Heat Exchanger and Burner", the disclosure of which is incorporated as if fully rewritten herein.

TECHNICAL FIELD

This invention relates generally to heating and cooling systems for use in commercial buildings, and specifically to the components included in such heating and cooling systems, particularly cooling devices, heating devices, and heat exchanger assemblies.

BACKGROUND OF THE INVENTION

Air conditioning or air handling units that include both heating and cooling capabilities are commonplace in modern society. Powerful industrial or commercial air conditioning systems are often utilized to condition (i.e., control the temperature and humidity) the air on the inside of buildings such as office towers, warehouses, factories, and schools. Such air conditioners are often very large in size and require significant amounts of space and energy to effectively handle and condition the air inside such industrial or commercial buildings.

Air conditioning units used for such applications typically include various compartments or sections that are dedicated to either heating or cooling the air stream flowing through the unit. In general, the cooling sections of such units include a compressor, an expansion valve, a heated coil, a chilled coil, a heat transfer gas such as Freon, multiple fans, and a control unit. The compressor, which is a pump, compresses cool Freon gas, causing it to become hot, high pressure, Freon gas. This hot gas moves through a set of coils where it dissipates heat and condenses into a liquid. Heat from this set of coils is dispersed to the outside environment by a fan which blows air across the heated coils. The liquid then passes through an expansion valve and evaporates to become cold, low-pressure Freon gas. The cold gas then runs through a second set of coils where it absorbs heat from the air inside the building. A second fan disperses the cooled air out of the air conditioner and into the space being cooled.

Prior art air conditioning systems, typically referred to as "multi-zone" or "dual-duct" systems, control the temperature of a room by varying the temperature of the air delivered to the room. Such systems are also referred to as "constant volume" systems because they deliver a constant airflow to each zone or room in a building. A primary advantage of constant volume systems is that they provide the desired ventilation, but do not require an excessive number of system parts and do not require complicated control sequences. Despite these advantages, constant volume systems are problematic in that they redirect air from the cooling section to the heating section of the unit. This redirection of air results in the final air supply being delivered to the room without the dehumidifying benefit of the system's cooling coil.

Certain other prior art systems that direct 100% of the air handled by the system through the cooling coil require either (i) an external heat source to reheat the air before it is delivered to a room or zone; or (ii) a method that reduces the airflow known as "Variable Air Volume (VAV)." VAV systems are typically used in spaces where occupancy of the area is variable. Thus, there is a need for an air conditioning unit that utilizes a more efficient means for directing air, and cooled air in particular, through the system.

In many air conditioning units, the condenser coil is located on the outside of the building that the unit is servicing. The heat generated by the coil is vented to the outside environment and any energy present in the form of heat is lost to the environment. Conceivably, this heated air stream could be directed back into the unit, and the energy from the heated air stream could be captured to increase the efficiency of the unit, i.e., increase output and/or reduce energy consumption. Thus, there is also a need for an increased efficiency air conditioning system that is capable of recapturing energy that is typically wasted by prior art systems.

Increased efficiency and/or reduced energy consumption may also be achieved by using certain specialty components within the system or air conditioning unit. One source for increasing efficiency in terms of heat output is the system's heat exchanger. Heat exchangers manufactured from cast iron have been commercially available for many years. Such heat exchangers are typically constructed to include a relatively large combustion chamber and smaller exhaust passageways which are used to increase the surface area of the heat exchanger and create greater heat exchange efficiency. The basic purpose of a large combustion chamber or area is to eliminate impingement of flame directly onto the heat exchanger membrane, thereby increasing the life expectancy of the assembly.

Such heat exchangers are often very large in size and consequently may be impractical for some applications. Additionally, these heat exchangers cannot typically be adapted to different system requirements and configurations. Furthermore, if the heat exchanger cracks or fractures, the entire unit must often be replaced. Thus, there is a need for an increased-efficiency, adaptable, easily serviceable heat exchanger for commercial and residential heating ventilating and cooling systems.

SUMMARY OF INVENTION

These and other limitations of the prior art are overcome by the present invention which provides a self-contained, fully-integrated, energy efficient heating and cooling system or apparatus for conditioning the air on the interior of a building. This heating and cooling system includes all of the benefits of the constant volume system while providing improved humidity control without the additional energy required to reheat cooled air. Unlike commercially available prior art systems that typically locate the condensing coil on the exterior of a building, the present invention locates the condenser coil within the housing of the unit itself so that conditioned air returned to the unit can be used to reduced the energy consumption of the condenser coil. Additionally, a secondary heating apparatus, separate and distinct from the main heat exchanger, is included with the present invention to provide tempered air in certain situations. Finally, the present invention optionally includes a secondary heat exchanger or energy reclaiming device that further enhances the efficiency and performance of the unit.

An exemplary embodiment of this invention includes a means for creating airflow through the apparatus, a section for cooling the airflow, a section for heating the airflow, means for directing the airflow into the cooling section or into the heating section, a reheat device for tempering (i.e., reheating) the airflow exiting the cooling section, a return air section for receiving air returned to the apparatus from the building interior, and means for pulling the returned air out of the return air section and venting the returned air to the environment outside of the building.

The heating section of the present invention also provides a novel "four-pass" heat exchanger a "four-pass" heat exchanger which may be manufactured from sections of cast iron or other suitable materials, and a high efficiency combustion burner which may be integrated into the four-pass heat exchanger. Advantages of this invention include improved efficiency, reduced size, and enhanced performance of the heat exchanger/burner assembly. An automated system for operating dual duct heating and cooling systems which utilize the heat exchanger/burner assembly of the present invention is also provided.

Further advantages of the present invention will become apparent to those of ordinary skill in the art upon reading and understanding the following detailed description of the preferred embodiments.

BRIEF DESCRIPTION OF THE DRAWINGS

The accompanying drawings and figures, which are incorporated in and form a part of the specification, schematically illustrate exemplary embodiments of the invention and, together with the general description given above and detailed description of the exemplary embodiments and examples given below, serve to explain the principles of the invention.

FIG. 2b is a top view of the burner assembly of FIG. 2a.

FIG. 2c is a front view of the burner assembly of FIG. 2a.

FIG. 3b is a top view of the air conditioning unit of FIG. 3a.

FIG. 4b is a top view of the air conditioning unit of FIG. 4a.

DETAILED DESCRIPTION OF THE INVENTION

The present invention provides a self-contained, fully-integrated heating and cooling system, apparatus, or unit for conditioning the air on the interior of a building or group of buildings. An exemplary embodiment of this apparatus includes a means for creating airflow through the apparatus, a section for cooling the airflow, a section for heating the airflow, a means for directing the airflow into the cooling section or into the heating section, a reheat device for tempering the airflow exiting the cooling section, a return air section for receiving air returned to the apparatus from the building interior, and a means for pulling the returned air out of the return air section and venting the returned air to the environment outside of the building.

In the exemplary embodiment, the reheat device is positioned between the cooling section and the heating section, and a portion of the cooled air exiting the cooling section is directed through the reheat device and is reheated by the device before exiting the apparatus to create a stream of tempered air. Preferably, the heating section includes a four-pass heat exchanger, although a two-pass heat exchanger may be utilized. The cooling section includes a refrigeration system that utilizes a refrigerant, a plurality of cooling coils, a condenser coil in communication with the cooling coils, and a compressor for moving the refrigerant through the cooling coils and the condenser. The cooling coils and the condenser are all contained within the housing that surrounds the various sections and components of the apparatus. The components of the air conditioning system of the present invention are discussed in greater detail below.

Heat Exchanger Assembly

As stated above, the air conditioning system of the present invention provides both a cooling section and a heating section. Preferably, the heating section includes an increased-efficiency heat exchanger assembly and an increased-efficiency combustion burner assembly that when used together provide a novel system for transferring heat energy generated by a combustion source to an air stream for the purpose of heating the air stream, while keeping the heated air stream separate from the products of combustion. Preferably, the burner assembly is installed in one of the cylindrical members of the heat exchanger assembly.

An exemplary embodiment of the present invention provides a heat exchanger assembly intended for use in, but not limited to, indirect fired, forced air-heating systems. In general, the heat exchanger of the present invention provides a greater than two-pass system wherein the heated gases from a burner make four passes across the surface area of the heat exchanger prior to exiting a flue and being vented from the system. Prior art heat exchangers typically include only a two pass or three pass heat exchanger. While the exemplary embodiment of the heat exchanger of the present invention includes four "passes," those skilled in the art will appreciate that additional passes or gas conduits may be added to this heat exchanger. For example, six-pass or eight pass heat exchangers are consistent with the design of the present invention. The exemplary four-pass system of the present invention provides numerous advantages, as will be apparent to those skilled in the art from the following detailed description.

Figure 1:
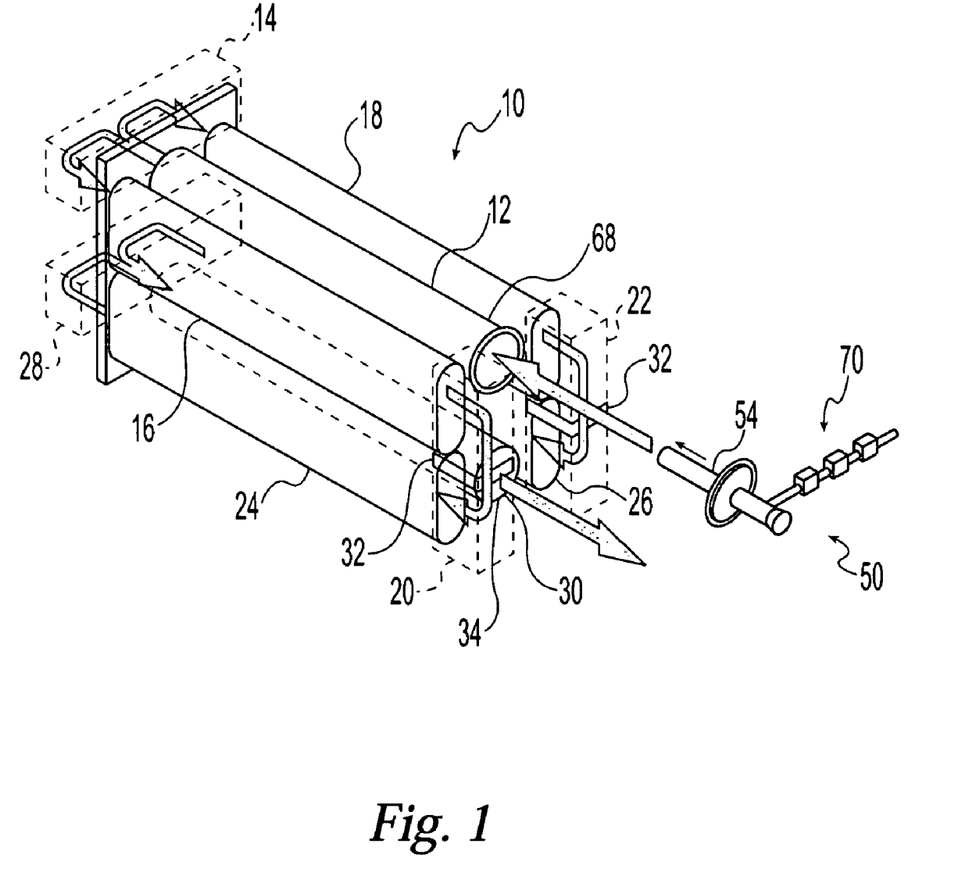
FIG. 1 is a cross sectional view of an exemplary embodiment of the heat exchanger assembly of the present invention depicting an exemplary configuration of the various sections of the heat exchanger and the preferred placement of the burner assembly within the heat exchanger assembly.

As best illustrated by FIG. 1, an exemplary embodiment of heat exchanger assembly 10 provides a first cylindrical member 12, first collector box 14, first gas conduit 16 and a second gas conduit 18, connectors 20 and 22, third gas conduit 24 and fourth gas conduit 26, second collector box 28, second cylindrical member 30, section couplers 32, and exhaust connection 34. Preferably, these components are manufactured from commercially available cast iron sections or castings. Typically, these commercially available castings include multiple protrusions or fins which extend outward from the surface of the casting and serve to increase the surface area of the casting.

As indicated by the arrows in FIG. 1, the products of combustion (i.e., heated gases) initially flow into first cylindrical member 12 and travel along the length of first cylindrical member 12 into first collector box 14 where the gas stream is divided from a single stream into a double stream. The divided gas stream flows from first collector box 14 into first gas conduit 16 and a second gas conduit 18 which are located on either side of, and run parallel to, first cylindrical member 12. After traveling the length of gas conduits 16 and 18, the heated gases flow into connectors 20 and 22. Connectors 20 and 22 direct the gas flow either up, down, left, or right depending on how heat exchanger assembly 10 is oriented. The gas flow then enters third gas conduit 24 and fourth gas conduit 26 which are parallel to and adjacent to gas conduits 16 and 18. The gas flow travels the length of conduits 24 and 26 and enters second collector box 28 where the divided gas stream is re-combined into a single gas stream. The recombined gas stream then enters and travels the length of second cylindrical member 30 were it eventually reaches exhaust connection 34.

Preferably, the various cylindrical members and conduits of heat exchanger assembly 10 are manufactured from individual prefabricated castings that, when connected together, form the length of the cylindrical members and conduits. For example, in an exemplary embodiment, cylindrical member 12 comprises two identical castings that are bolted together. These castings typically include mating surfaces that permit assembly using standard machine bolts. Thus, replacement or repair of the assembly or its components can be accomplished with standard hand tools. An advantage of this type of construction is that if one casting cracks or fractures, it can be replaced without replacing the entire heat exchanger assembly. Thus, the expense of repairing the heat exchanger of the present invention is likely to be significantly less than repairs for other types of heat exchangers. Furthermore, the overall length of heat exchanger assembly 10 can be increased or decreased by simply adding or removing sections (i.e., castings).

In an exemplary embodiment, the placement of gasket material, preferably high temperature glass wool, between the sections of the cylindrical members and conduits addresses any possible thermal expansion of the assembly and its components by allowing each section to expand without imposing excessive stress on any other section. These gaskets reduce the likelihood that the sections of heat exchanger will crack or fracture due to thermal expansion.

The configuration of the cylindrical members and gas conduits shown in FIG. 1 results in the products of combustion, i.e., heated gases, reversing direction at least four times before exiting heat exchanger assembly 10. Consequently, the velocity of the gas passing through the sections is reduced and the time that the heated gas remains in the sections is increased, thereby allowing more efficient transfer of heat from the combustion gas though the cast iron into the air stream which passes over the heat exchanger.

Preferably, conduits 16, 18, 24, and 26 when viewed in cross section, are "teardrop" shaped. This shape enhances the efficiency of the airflow across heat exchanger assembly 10 and increases the transfer of heat energy across the castings to the air stream. This transfer of energy from the heated gases to the air stream occurs through the membrane (i.e., the cast iron) of the heat exchanger; however, complete separation of the combusted gases and this secondary air stream on the exterior of the heat exchanger is maintained.

As stated above, a high temperature gasket material such as glass wool may be placed between the castings that form conduits 16, 18, 24, and 26 as well as cylindrical members 12 and 30 during the construction of heat exchanger assembly 10. This gasket material effectively seals the various sections of the heat exchanger and prevents the heated gases from contaminating the air stream.

The efficiency of heat transfer through the heat exchanger membrane (i.e., cast iron or other metal) is typically a function of contact area, temperature differential, transmission, convection, and radiance. The preferred configuration of the present invention enhances the convection aspect of the system's operation, and increases the rate of energy transfer. Alternate embodiments of heat exchanger assembly 10 include various internal devices that promote turbulent flow of the products of combustion thereby further enhancing the efficiency of the exchanger.

Advantageously, the exemplary embodiment of the assembly results in a heat exchanger that is more compact than possible with previously known configurations. The configuration of the preferred embodiment is also symmetrical about the vertical and horizontal axis, thereby allowing a single configuration to be used for up flow, down flow, and horizontal applications. This configuration also allows the burner to be installed in cylindrical member 12 as shown in FIG. 1, thereby producing a "counter-flow" or to be installed in cylindrical member 30, thereby producing a "parallel flow" of gases through heat exchanger assembly 10. Counter flow causes the highest temperature combustion gas to occur on the discharge air of the secondary air stream, thereby further increasing the efficiency of thermal transfer of heat exchanger assembly 10.

Heat exchanger assembly 10 can be incorporated into a heating system which utilizes a forced draft burner or an atmospheric draft type burner which combusts multiple fuels. While the preferred embodiment may be utilized with several types of burners, it is particularly suitable for use with a cylindrical metal fiber burner firing either natural or manufactured gas such as propane. A novel cylindrical metal fiber burner is described below.

Burner Assembly

The present invention provides a burner assembly designed for use with a heat exchanger that utilizes a cylindrically-shaped combustion chamber. This invention maximizes the efficiency of heat transfer from the burner assembly to the heat exchanger assembly and increases the overall performance of the system while reducing harmful emissions such as carbon monoxide and nitric oxides. Burner assembly 50 may be described as a parallel positioning system for the attached devices which allows the system to compensate for variations caused by differences in the various metering devices. Preferably, heat exchanger assembly 10 and the burner assembly 50 operate as an integrated unit. As shown in FIG. 1, first cylindrical member 12 serves as combustion chamber 68 when the burner is inserted into the cylindrical member. Second cylindrical member 30 may also serve the combustion chamber. In one embodiment, the cylindrical member used as combustion chamber 68 is lined with an insulating material such as, for example, refractory cement line that serves to protect the interior surface of the chamber.

Figure 2A:
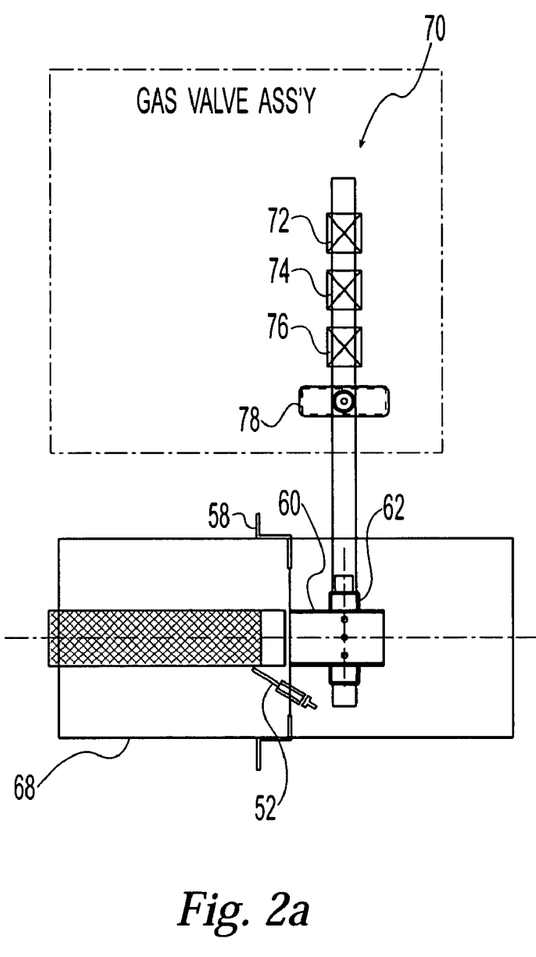
FIG. 2a is a side view of an exemplary embodiment of the burner assembly of the present invention depicting the placement of the burner assembly in the combustion chamber and showing the placement and organization gas valve assembly.
Figure 2B:
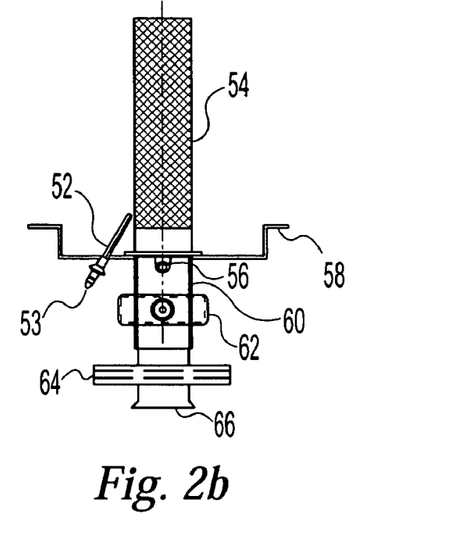
Figure 2C:
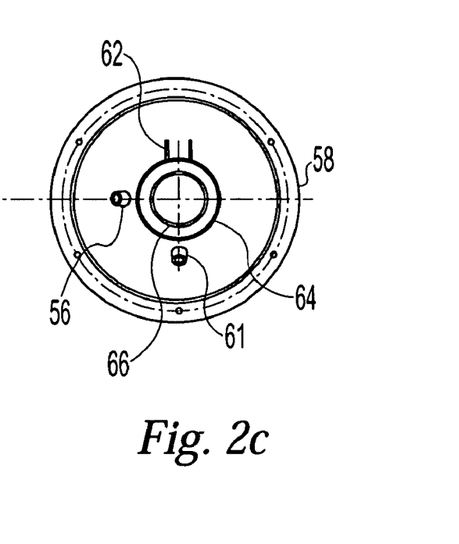

As best illustrated by FIGS. 2a-c, burner assembly 50 includes spark ignition device 52, metal fiber combustion surface 54, flame detector port 56, flanged mounting adapter 58, fuel/air mixing chamber 60, fuel gas distributor plenum 62, motor operated iris damper 64, screen 66, combustion chamber 68, gas valve subassembly 70, safety gas valve 72, vent valve 74, safety valve 76 and fuel metering valve 78. An exemplary embodiment of burner assembly 50 also includes flame safety controllers and detectors including UV flame detectors and programmable flame safety controller (not shown), as well as gas pressure regulating devices and volume control devices (not shown).

Spark ignition device 52 includes transformer, ignition wire, and spark plug 53. Spark ignition device 52 is arranged to furnish an ignition spark adjacent to the metal fiber combustion surface. Spark ignition device 52 is similar to one manufactured by Westwood ignition products.

Gas valve subassembly 70 includes motorized and solenoid valves. Fuel metering valve 78 is fitted with the same type of actuator as found in a commercially available Honeywell system. The valve is a Honeywell valve and is specifically designed as part of a burner optimization system that independent positioning of each valve to accomplish the optimum combustion over the entire capacity range of the burner. The application of the Honeywell combustion controller allows vent (air) valve 74, fuel valve 78, and if installed, a flue gas recirculation valve, to operate in response to a preprogrammed positioning sequence.

An exemplary embodiment of burner assembly 50 includes air volume control devices including dampers and actuators. Air inlet valves (e.g., vent valve 74) precisely control the flow of air into the mixing chamber. An iris type damper (Continental Fan, Buffalo, N.Y.) is a suitable inlet valve. Damper 64 is fitted with a motor actuator to position the damper to precisely control the airflow into the burner. A commercially available Honeywell actuator specifically designed to be used with a fuel-air mixture controller is a suitable motor actuator. The motor is designed to control a fuel valve, an air damper, and a flue gas recirculation valve for burners. Combining the use of this motor with the iris damper is a novel aspect of the burner assembly.

Fuel/air mixing chamber 60 comprises a permeable membrane assembly, which contains the fuel, air mixture and creates a metal fiber combustion surface 54 to enhance the combustion efficiency of the air fuel mixture. The combustion of a gas air mixture within the combustion chamber is precisely controlled by this assembly. Fuel/air mixing chamber 60 promotes complete mixing of the fuel and air prior to combustion by generating perpendicular flow patterns for the two gases that enter the mixing chamber.

Fuel/air mixing chamber 60 includes a cylindrical air inlet 61 with a larger fuel/air mixing chamber 60 surrounding it. Orifice openings placed between the chambers direct the fuel gas into the air stream in a manner to create turbulence and increase mixing of the gas and air. By precisely metering the air and fuel into the burner, the combustion efficiency can be maximized over the entire capacity range of the burner. The burner of the present invention typically operates at a combustion efficiency of about 85%, which exceeds the current industry standard of 75 to 80% efficiency. The air fuel mixture is then delivered to a cylindrical metal fiber combustion surface 54 shaped and sized to match the requirements of the system capacity.

The size and location of metal fiber combustion surface 54 is determined by the requirements of the heat exchanger to which it is applied. The combustion surface distributes the flame evenly over the entire face of the burner, facilitating the complete mixing and complete combustion of the fuel. This enhances the performance of the burner and reduces undesirable and potentially harmful emissions.

An exemplary embodiment of burner assembly 50 includes a draft inducing fan assembly (not shown) to remove the products of combustion from heat exchanger assembly 10. The burner is naturally aspirated and utilizes draft created by a fan located at the discharge of heat exchanger assembly 10. Fan operation is involved in the operation of burner assembly 50 and a flow proving interlock is preferably included to assure operation of the draft fan prior to introduction of any fuel into the burner. Preferably, the draft fan is an integral part of the burner; however, the fan may be located remotely from the heating device.

Preferably, burner assembly 50 also includes an industry standard flame safety control system (e.g., Honeywell) utilizing an ultra violet flame detector, program flame safety controller ignition system. Burner assembly 50 is a fully modulating burner with a high turn down ratio of about 20 to 1 with precise control of the air fuel mixture over the entire range of operation. Burner assembly 50 can respond signals for various types of control devices as required by the installation for both start/stop and modulation. Burner assembly 50 can be installed with industry standard operating and limit controls as required by any governing authorities for the installation.

Air Conditioning Unit

The present invention also provides an improved arrangement of system components for heating, cooling, and dehumidifying buildings, especially buildings including multiple zones or rooms which can be served by a centralized air conditioning system. Advantages of the present invention include increased or enhanced energy recovery (i.e., greater energy efficiency) and improved system performance, including improved humidity control.

Figure 3A:
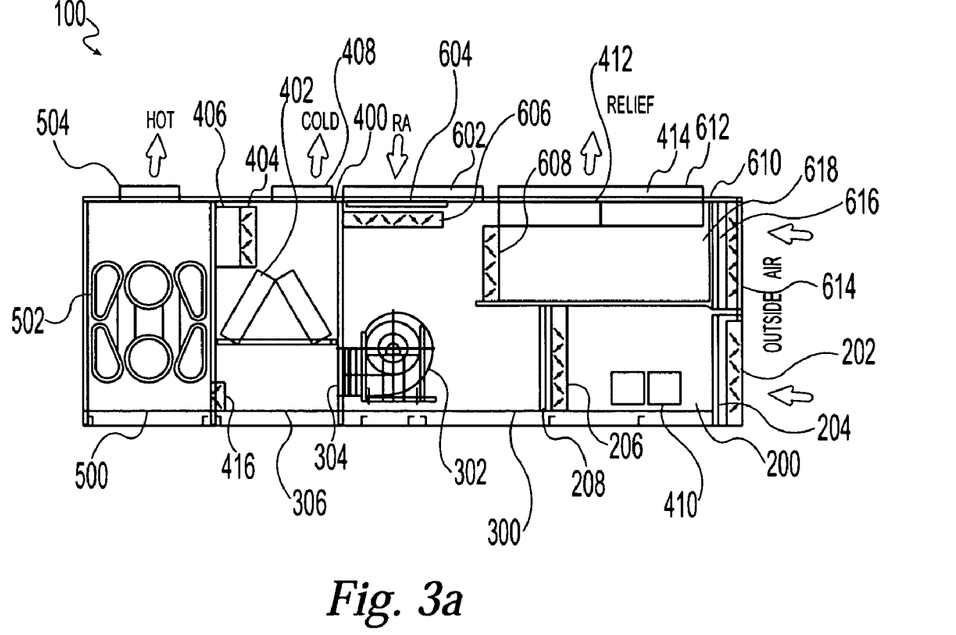
FIG. 3a is a cross-sectional view of an exemplary embodiment of the air conditioning unit of the present invention showing the various sections and components of the unit.
Figure 3B:
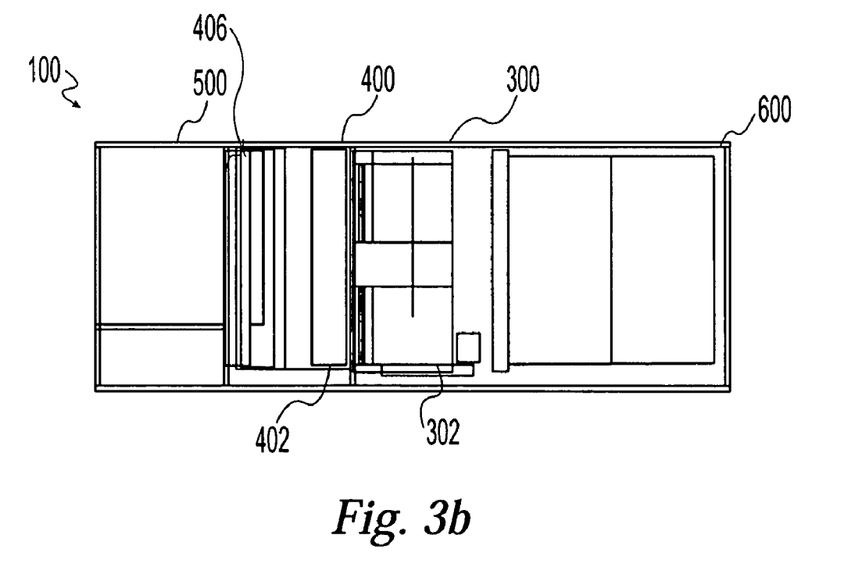

As shown in FIGS. 3a and 3b, and according to an exemplary embodiment, the present invention provides a fully integrated heating and cooling unit 100 enclosed within an encasement or housing. One embodiment of this housing provides entrance and egress points (i.e., doors or ports) into and out of the unit which allow easy access to the internal components. The air utilized by unit 100 enters the heating and cooling unit from two primary sources: primary external air intake 200 and return air inlet 602. The air drawn into the unit at primary external air intake 200 is pulled into the unit from the outside environment. This air is commonly referred to as "dilution air" and is necessary for proper ventilation of the building. The second source of air is air returned to the unit from the conditioned space on the interior of the building. This air is commonly referred to as "return air."

Unit 100 includes a system of automatically controlled dampers that are configured to control the airflow into the units itself and/or into the various sections of the unit. In the exemplary embodiment shown in FIG. 3a, first damper 202, fifth damper 606, and seventh damper 614 control the flow of air into the unit, either from the external environment or from the conditioned space within the building. Likewise, optional second damper 206, third damper 404, fourth damper 416, sixth damper 608 are arranged on the interior of the unit to meter the respective amounts of dilution air and return air that are utilized by the system. The system is capable of utilizing of up to 100% of either type of air for delivery to the conditioned room or zone.

With reference again to FIGS. 3a and 3b, upon entering unit 100, air passes through filters that have variable capacity for the removal of contaminants. Air entering the unit at primary external air intake 200 (see the arrow labeled "A" in FIG. 5: note that the air flow depicted in FIG. 5 is reversed compared to the air flow entering the unit in FIGS. 3a and 4a) passes through first filter 204, while air entering the unit at return air inlet 602 passes through third filter 604. From the filters, both air streams enter blower section 300. Blower 302 provides the energy required to move the combined air streams through the heating and cooling sections of the unit, as described below.

Upon passing through first filter 204, air drawn into the unit from the outside environment flows into blower section 300 (see the arrow labeled "B" in FIG. 5). In an alternate embodiment, the air stream passes through second damper 206 and second filter 208, which are optionally included in unit 100. Air returning to unit 100 from the conditioned space passes through third filter 604 and fifth damper 606 into blower section 300 (see the arrow labeled "H" in FIG. 5). Blower 302 forces the air through air passage 304 into antechamber 306. From antechamber 306 the airflow is directed into cooling section 400 (see the arrow labeled "C" in FIG. 5) or into heating section 500 through fourth damper 416 (see the arrow labeled "D" in FIG. 5).

Air that is forced into cooling section 400 passes first over cooling coils 402 which cool and dehumidify the airflow. The cooled air may then exit unit 100 at cooled air outlet 408 (see the arrow labeled "E" in FIG. 5). The preferred method of cooling utilizes a compressor driven refrigeration cycle using standard refrigerants and including air coils used both for condensing and evaporation of the refrigerant(s). The preferred cooling coil is a direct expansion cooling coil commonly referred to a DX cooling coil. In the exemplary embodiment shown in FIG. 3*a*, compressor 410 is mounted in primary external air intake 200, cooling coils 402 are mounted in cooling section 400, and condenser coil 412 is mounted atop mixing chamber 618.

Advantageously, in the exemplary embodiment of the present invention, a portion of the air that has been cooled in cooling section 400 may also be directed through third damper 404 into hot gas reheat coil 406 when heating section 500 is bypassed by the system (see the arrow labeled "G" in FIG. 5). Reheat coil 406 is typically used to temper the air stream before it exits unit 100 by way of heated air oulet 504. Hot gas reheat coil 406 utilizes as portion of the hot gas from the compressor discharge for the purpose of reheating the cooled airflow entering the reheat coil from cooling section 400. Gas is typically discharged from compressor 410 at a temperature of about 120° F. (248° C.). Before this heated gas is directed to condenser 412, the heated gas is diverted to hot gas reheat coil 406. As the hot gas passes through the reheat coil, the refrigerant condenses to a liquid state. The liquid is then directed to the cooling coil expansion valve.

This novel aspect of the present invention permits unit 100 to produce a fully dehumidified air stream that is reheated by reheat coil 406 only to the extent necessary to prevent any room from becoming undesirably cold under partial load conditions. Thus, when heating section 500 is bypassed, the air that exits the unit and heads toward the rooms within the building is either cooled air or tempered air.

When unit 100 is operating in heating mode, cooling coil 402 is inactive as is hot gas reheat coil 406. Fourth damper 416 allows a portion of the air stream to pass through heating section 500, while the remainder of the air stream passes over the inactive cooling coil and out of the unit by way of cooled air outlet 408. Thus, the air that exits the unit and heads toward the rooms within the building is either warm air or tempered air.

The portion of the airflow that is directed into heating section 500 passes over heat exchanger 502 which heats the airflow and out of unit 100 by way of heated air outlet 504 (see the arrow labeled "F" in FIG. 5). The preferred heating source is an indirect gas fired furnace with modulating burner and cast iron heat exchanger (see description above). Alternate embodiments of air handling unit 100 incorporate different types of heating sources. For example, water, stream, or electric coil devices, or fuel fired furnaces may all be utilized in alternate embodiments of the present invention.

After the cooled, heated, or tempered air has been delivered to the interior space of the building, the air is returned to air conditioning unit 100 by way of return air inlet 602 (see the arrow labeled "H" in FIG. 5) and is either re-circulated through the unit by blower unit 302 or is exhausted from the building through relief air outlet 612 (see the arrow labeled "I" in FIG. 5). Due to the efficiency of the air conditioning unit 100, the amount of relief air that exits the unit is typically very close to the amount of outdoor air delivered to the internal space of a building with some loss resulting from local exhaust and leakage through the building envelope.

As stated, relief air, which is air returned to the unit from the building, is necessary to equalize the internal and external pressure of the conditioned space. The relief air has already been conditioned by air conditioning unit 100, and when the system is in cooling mode, the relief air is considerably lower in temperature than the external ambient temperature. For example, on a typical summer day, the outdoor temperature may be 90° F., while the temperature of the relief air is approximately 70° F. As described below, this cooler air is utilized by the present invention to reduce the energy consumption of unit 100.

In an exemplary embodiment of the present invention, condenser coil 412 is mounted on the interior of air conditioning unit 100 rather than being physically separated from the other components of the unit. Mounting the condenser coil on the interior of the unit permits the preconditioned relief air to be directed across the condenser coil by fan 416. By directing the cooled relief air through condenser coil 412, along with a quantity of air drawn from the outside by way of secondary external air intake 618 (see the arrow labeled "J" in FIG. 5), the efficiency of the condenser is enhanced by reclaiming a portion of the cooling energy that is wasted by prior art systems when such cooled air is simply vented as exhaust. Locating the condenser on the interior of the unit also prolongs the life of the coils and minimizes the need to clean the coils on a periodic basis. In the exemplary embodiment shown in FIG. 3*a*, the conditioned relief air and the air drawn into the unit by way of secondary external air intake 618 are mixed in mixing chamber 610. Airflow into mixing chamber 610 is controlled by sixth damper 608 and seventh damper 614.

Figure 4A:
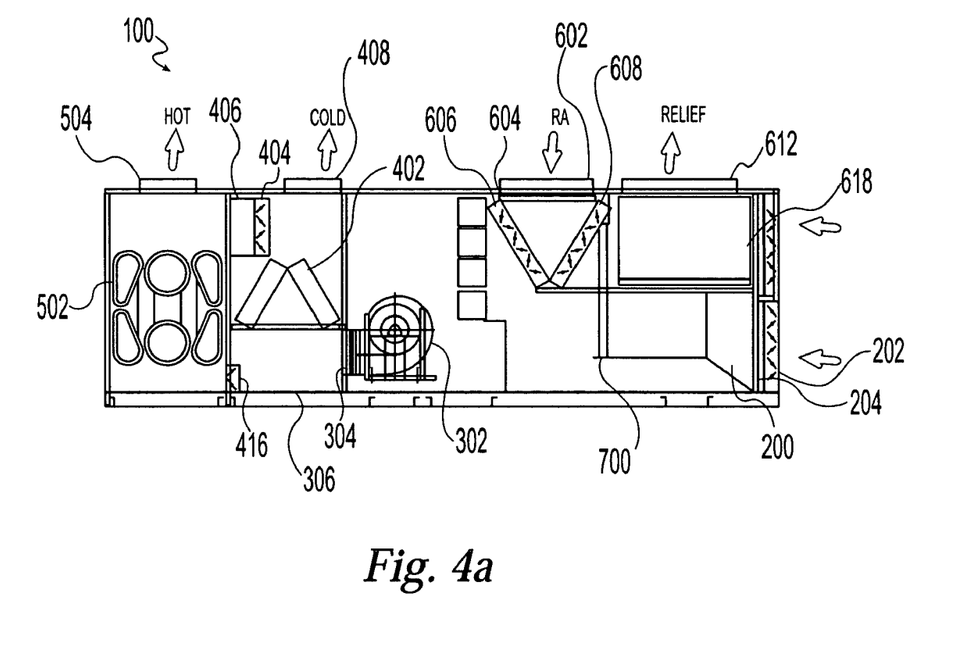
FIG. 4a is a cross-sectional view of an alternate embodiment of the air conditioning unit of the present invention wherein an auxiliary heat exchanger or "energy reclaiming device" has been included on the interior of the unit.
Figure 4B:
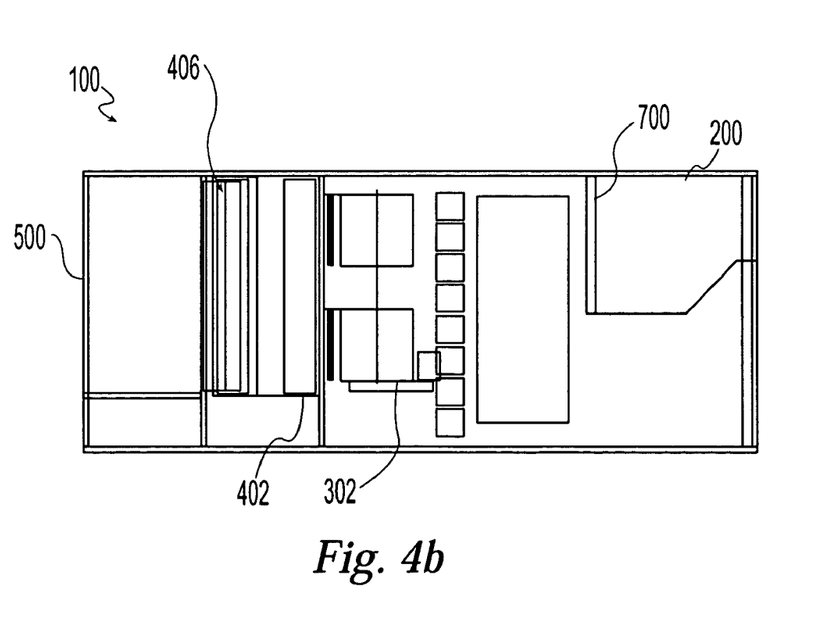
Figure 5:
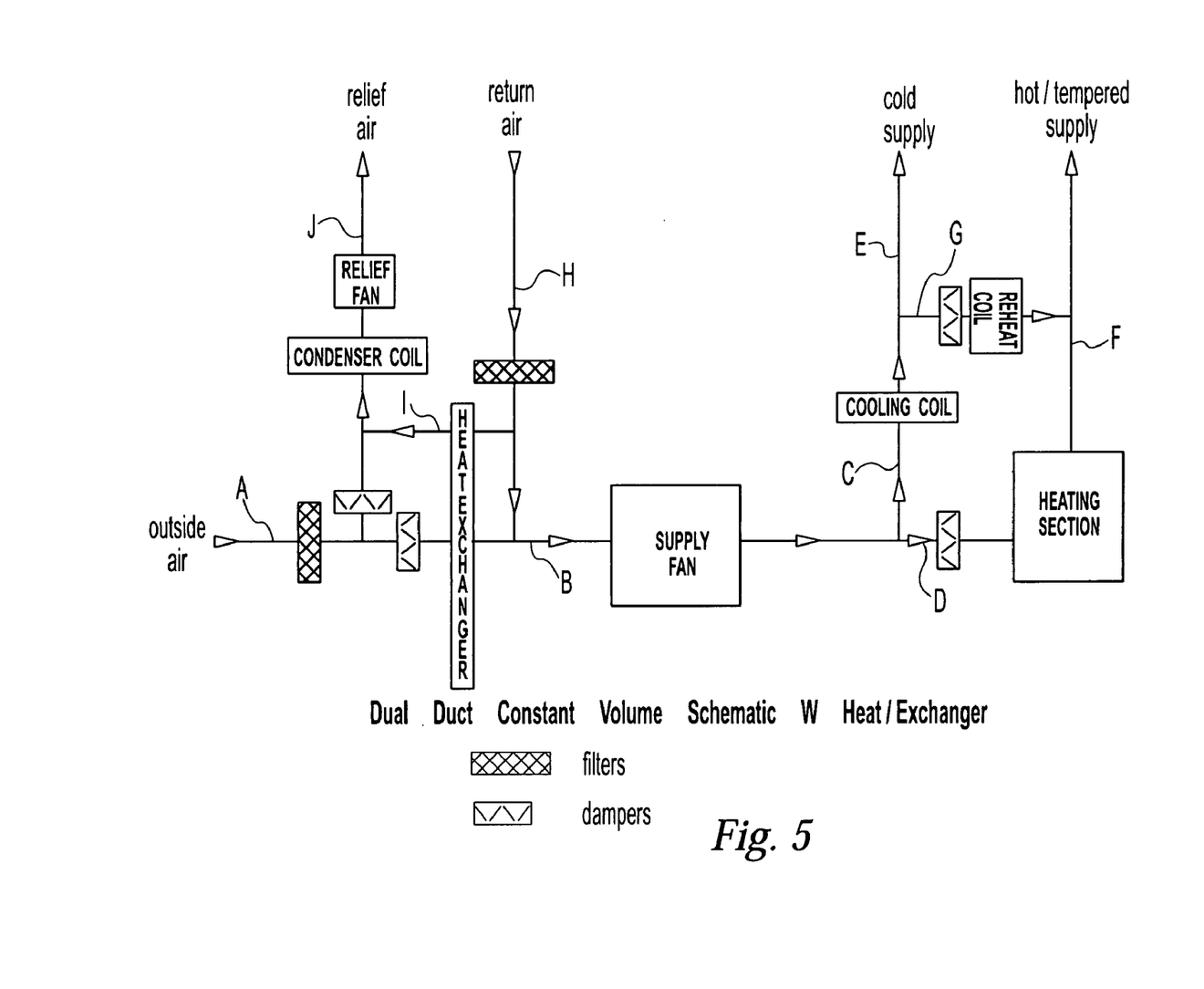
FIG. 5 is a diagrammatic representation of the typical flow of air through an exemplary embodiment of the air conditioning unit of the present invention.

As shown in FIGS. 4*a* and 4*b*, unit 100 can be fitted with an air-to-air heat exchanger to reclaim energy normally wasted in the exhaust air stream. Energy reclaiming device 700 is typically mounted between primary external air intake 200 and blower section 300 and extends into relief air section 600. The energy reclaiming device, often referred to a "heat wheel" operates by passing a piece of material, typically an aluminum or plastic in a finned configuration, through the primary air intake section and the relief air section in an alternating fashion. Thus, heat present in one air stream is transferred to the other air stream by such a device.

In alternate embodiments, energy reclaiming device 700 is any of a variety of heat exchanger types including a heat wheel, plate fin, or a heat pipe. The heat exchanger can reclaim sensible heat only or both sensible heat and latent heat depending on the type of energy reclaiming device incorporated in to the system.

System Operation

The present invention includes a method for controlling the heating and cooling sections of an air-handling unit to eliminate the possibility of simultaneous heating and cooling. This control system utilizes network communications and provides a method for communicating heating and cooling requirements from internal space temperature controllers to a central device or control module which is typically located on the exterior or interior of the unit. This module provides for an improved sequence of controls for a dual duct air handler that eliminates simultaneous heating and cooling and controls the operation of the unit based on the maximum deviation from the set point of the associated rooms or spaces.

The system of the present invention may be described as a "hot duct/not so hot duct" or a "cold duct/not so cool duct." An algorithm is created which is based on polling all the room temperatures and set points and determining the maximum call or requirement for heating and cooling. This information is communicated to the air handling unit controller and the required set points are calculated for each duct. This occurs on a continuous basis, and over time the set points tend to approach the same value. After the set points are calculated, the outdoor air temperature is used to determine if heating or cooling is required. The unit then functions to satisfy the largest errors with the other spaces by blending air to maintain the interior temperature. A primary advantage of this system is that it provides constant airflow to the interior space and therefore constant ventilation is achieved simultaneously.

While the above description contains many specificities, these should not be construed as limitations on the scope of the invention, but rather as exemplification of preferred embodiments. Numerous other variations of the present invention are possible, and it is not intended herein to mention all of the possible equivalent forms or ramifications of this invention. Various changes may be made to the present invention without departing from the scope of the invention.

What is claimed:

1. A heat exchanger system for use with heated gas, comprising:
    (a) a heat exchanger, wherein the heat exchanger further comprises:
        (i) a first member adapted at one end to receive heated gas;
        (ii) a first gas conduit, and a second gas conduit positioned substantially in parallel to the first member;
        (iii) a first collector connected to the first member for dividing the gas flow from the first member between the first and second gas conduits;
        (iv) a third gas conduit and a fourth gas conduit positioned substantially in parallel to the first gas conduit and the second gas conduit;
        (v) a first connector connected to the first gas conduit for connecting the first gas conduit to the third gas conduit;
        (vi) a second connector connected to the second gas conduit for connecting the second gas conduit to the fourth gas conduit;
        (vii) a second member positioned substantially in parallel with the third gas conduit and the fourth gas conduit;
        (viii) a second collector connected to the third gas conduit and the fourth gas conduit for combining the gas flow from the third gas conduit and the fourth gas conduit into the second member; and
    (b) a means for creating a flow of heated gas through the heat exchanger, wherein the means for creating the flow of gas through the heat exchanger further comprises a blower.

2. The heat exchanger system of claim 1, wherein each of the members and gas conduits comprise multiple sections.

3. The heat exchanger system of claim 2, wherein the multiple sections further comprise a gasket material positioned between the sections for allowing the sections to expand and contract.

4. The heat exchanger system of claim 1, wherein the heat exchanger is manufactured from cast iron.

5. The heat exchanger system of claim 1, wherein the means for delivering heated gas to the heat exchanger comprises a burner assembly, the burner assembly further comprising:
    (a) a means for directing uncombusted gas into the burner assembly;
    (b) a damper for controlling the flow of air into the burner assembly;
    (c) a mixing chamber for mixing the uncombusted gas with air;
    (d) a spark source for igniting the gas/air mixture; and
    (e) a combustion surface for enhancing the combustion efficiency of the gas/air mixture.

6. An integrated air conditioning device, comprising:
    (a) a housing comprising multiple sections;
    (b) a primary air intake for receiving air from the external environment;
    (c) a cooling section, wherein the cooling section further comprises:
        (i) at least one refrigerant;
        (ii) a plurality of cooling coils;
        (iii) a first condenser coil in communication with the cooling coils; and
        (iv) a compressor for moving the refrigerant through the cooling coils and the condenser coil; and
    (d) a heating section, wherein the heating section further comprises a heat exchanger, and wherein the heat exchanger further comprises:
        (i) means for delivering heated gas to the heat exchanger;
        (ii) a first member in communication at one end with the gas delivery means;
        (iii) a first gas conduit and a second gas conduit positioned substantially parallel to the first member;
        (iv) a first collector in communication with the first member for dividing the gas flow from the first member between the first and second gas conduits;
        (v) a third gas conduit and a fourth gas conduit positioned substantially parallel to the first gas conduit and the second gas conduit;
        (vi) a first connector in communication with the first gas conduit for connecting the first gas conduit to the third gas conduit;
        (vii) a second connector in communication with the second gas conduit for connecting the second gas conduit to the fourth gas conduit;
        (viii) a second member positioned substantially parallel to the third gas conduit and the fourth gas conduit;
        (ix) a second collector in communication with the third gas conduit and the fourth gas conduit for combining the gas flow from the third gas conduit and the fourth gas conduit into the second member; and (x) means for creating a flow of the heated gas through the heat exchanger; and (e) a reheat device in communication with the cooling section and the heating section;

(f) a return air section, wherein the return air section further comprises;
(i) a return air intake;
(ii) means for re-circulating the return air through the cooling and heating sections; and
(iii) means for venting return air from the air conditioning device; and (g) a blower section in communication with the primary air intake, cooling, heating, and return air sections, wherein the blower section further comprises a blower for creating airflow through the device; and (h) a plurality of electronically controlled dampers for controlling airflow through the air conditioning device.

7. The device of claim 6, further comprising a programmable control module for controlling the operation of the air conditioning device.

8. The device of claim 6, further comprising an energy reclaiming device positioned within the housing between the primary air intake and the blower section and extending into the return air section for redirecting air from the return air section back into the cooling section and the heating section.

9. The device of claim 6, further comprising a plurality of air filters located downstream from the plurality of electronically controlled dampers.

10. The device of claim 6, wherein the return air section further comprises:
(a) a mixing chamber in communication with the return air section further comprises:
(b) a secondary air intake in communication with the mixing chamber;
(c) a second condenser coil mounted within the mixing chamber; and
(d) a fan in communication with the second condenser coil and the external environment for moving air from the mixing chamber across the second condenser coil.

11. The device of claim 10, wherein a first damper is located within the primary air intake, a second damper is located between the primary air intake and the blower section, a third damper is located between the cooling section and the reheat device, a fourth damper is located between the cooling section and the heating section, a fifth damper is located within the return air intake, a sixth damper is located between, the return air section and the mixing chamber, and a seventh damper located within the secondary air intake.

12. The device of claim 6, wherein the means for creating the flow of gas through the heat exchanger further comprises a blower in communication with the end of the second member opposite the second collector box.

13. The device of claim 6, wherein each of the first and second members and each of the gas conduits further comprise:
(i) a plurality of individual sections detachably joined to one another; and
(ii) gasket material positioned between the individual sections.

14. The device of claim 6, wherein the gas conduits are manufactured from cast iron.

15. The device of claim 6, wherein the means for delivering heated gas to the heat exchanger comprises a burner assembly, and wherein the burner assembly further comprises:
(a) means for directing uncombusted gas into the burner assembly;
(b) a damper for controlling the flow of air into the burner assembly;
(c) a mixing chamber for mixing the uncombusted gas with air;
(d) a spark source for igniting the gas and air mixture; and
(e) a combustion surface for enhancing the combustion efficiency of the gas and air mixture.

* * * * *